Oct. 9, 1956  W. H. BROWNE  2,766,079
ROD END BEARING
Filed May 9, 1952

INVENTOR.
William H. Browne.
BY
Wood, Herron & Evans.
ATTORNEYS.

United States Patent Office 2,766,079
Patented Oct. 9, 1956

2,766,079

ROD END BEARING

William H. Browne, Cincinnati, Ohio, assignor, by mesne assignments, to William H. Browne and Roger F. Martin, Newtown, Ohio, trustees Application May 9, 1952, Serial No. 286,984

4 Claims. (Cl. 308—72)

This invention relates to universal joints and is addressed in particular to improvements in relatively small joints or bearings of the ball and socket type, which are known in the mechanical industries as "rod end bearings."

Bearings of this class are used extensively in control linkage systems and other mechanisms to provide articulated joints between links, levers and the like. To a considerable extent, the rod end bearing has been substituted in high grade control equipment for the well-known clevis and pin connections formerly used because it has the advantage of providing, at least to a limited extent, universal angulation or swivelling of the linkage members; thus, it allows self-alignment of the moving parts whereas the clevis connection articulates only in a single plane.

In short, rod end bearings of the present type, while more expensive than the clevis type connection, are highly desirable in precision fitted mechanisms and linkage systems because they eliminate looseness between moving parts by virtue of their precise running fit and generous bearing surfaces. Of equal or greater importance, depending upon the type of linkage system or mechanism, is the universal angulation or swivel action provided by the ball end bearing.

To cite a few typical examples, many linkage systems include rod sections or links connected together to transmit lineal movement from one another, the links being generally coaxial but slightly angulated. In such cases, the bearing, by its universal angulation, transmits the lineal motion but compensates for the misalignment in direction and thus eliminates strains and binding at the joints. In other instances, the pivotal connection may be required to transmit the lineal motion of a link to a lever which swings in an arcuate plane, the arcuate plane being angularly related to the path of lineal movement of the link. In such cases, the rod end bearing provides the necessary pivotal connection between the lever and link and additionally, it compensates for the angularity in the two planes of motion. In such instances and many others, the rod end bearing exhibits operating characteristics far superior to the clevis type connection and consequently is used in large quantities.

Several types of rod end bearings are presently on the market, but so far as can be ascertained, all of them are subject to certain objections which in the long run, detract seriously from their efficient performance. Due to their relatively small size, it has been the practice, in the case of several widely used bearings, to assemble them by press fitting operations under heavy pressure. The precise mode of assembly differs from one make of bearing to the next, but the following common faults are inherent. First, the initial fit between the ball and socket cannot be held to close limits of tolerance in press fitting; therefore some of the bearings are fitted too tightly while others are too loose. Secondly, the permanent press fitted assembly is not susceptible to convenient reconditioning if the bearing becomes worn after prolonged service; instead, if close fitting is necessary, the bearing must be replaced with a new one when it becomes worn.

It is therefore a primary object of the present invention to provide a ball end bearing which is superior to those presently available in that the bearing is capable of being set conveniently to a close running fit upon assembly which is uniform for each unit. The arrangement is such that the assembled rod end bearing is capable of being reset to its original close fit after having become loose after prolonged hard service.

It is a further object to provide an improved means for locking the bearing in adjustment at assembly, the locking means being capable of release to allow the bearing to be reset and providing a positive lock which is adapted to maintain the bearing permanently in adjusted condition.

Conventional rod end bearings essentially consist of a body or holder having an enlarged head at one end in which is formed a socket having spherical bearing surfaces engaging a ball, the ball being free to swivel universally within its socket. The body is arranged to be secured to one movable member and the ball is arranged to be secured to a second member thereby providing the articulated joint between them.

It is the concept of the present invention to form the socket from a pair of opposed bushings which are threaded into the head from opposite sides to provide adjustment, the sockets having internal spherical bearing surfaces upon their opposed inner ends adapted to slidably engage the ball and having locking flanges on their outer ends which cooperate with locking devices anchored in the body to lock the bushings in set position.

This arrangement permits the parts to be assembled manually in a convenient manner by screwing the bushings into the body from opposite sides with the ball member first placed between them. The bushings are machined to seat against the ball before the locking flanges seat against the body; therefore, the bushings are locked with their opposed internal bearing surfaces engaged against the ball while retaining clearance between the flange and body to allow for future adjustments for wear.

While the invention is disclosed in its preferred embodiment with two threaded bushings engaging the ball, it will also be obvious that one of the spherical ball seats may be formed as an integral part of the body as disclosed in the drawings. In this aspect of the invention, one adjustable bushing cooperates with the integral seat formed in the body to provide the spherical ball seat.

Also in the following disclosure, a set screw is illustrated as a preferred mode of locking the bushing or bushings in set position and a second embodiment is disclosed in which spring loaded latch pins are utilized in place of the set screws to perform the same function. The set screws or latch pins are intended to be utilized either with the single or double bushings and in either event, are used where there is either violent reciprocation or where there is need for more frequent adjustment.

Further features and advantages of the invention are disclosed in the detailed description in connection with the accompanying drawings.

Figure 1:
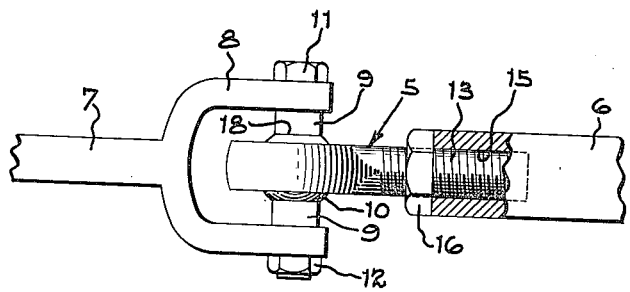
Figure 1 is a fragmentary view showing the rod end bearing installed in operating position as a connecting element between a pair of articulated links as one example of its utility.

As explained previously, the rod end bearings have a wide range of utility in linkages which require pivotal connections and which require at least a partial degree of universal articulation at the pivotal connection. In the example shown in Figure 1, the rod end bearing, which is indicated generally at 5, is utilized to provide the pivotal connection between a link 6 and a lever 7 so as to convert the longitudinal movement of the link into angular lever movement.

In the present disclosure, the lever is provided with a fork 8 which straddles the ball end bearing, the fork being provided with spacers 9—9 clamped against opposite sides of the ball 10 of the bearing. The fork 8 is secured rigidly to the ball by means of the bolt 11 which passes through the fork, spacers and ball, the limbs of the fork being clamped rigidly to the ball by the nut 12.

Since the ball floats universally with respect to the bearing unit 5, a partially universal joint is provided between the link and lever which compensates for any angularity in the plane of movement of the two parts. Thus, as distinguished from an ordinary pivot or clevis connection, the ball end bearing relieves the linkage of any stresses which may otherwise develop by reason of misalignment, twisting force and other factors. The bearing unit thus has wide utility as a stress relieving connection in various types of mechanisms and linkage systems.

Figure 2:
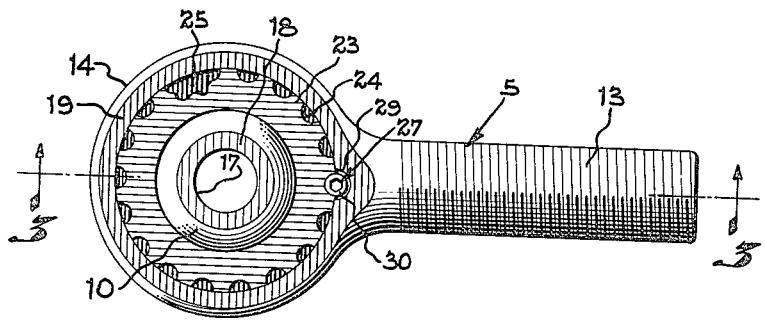
Figure 2 is an enlarged face view of the bearing before installation in the linkage.

Described in detail with reference to Figures 2 and 3, the present rod end bearing consists of a threaded shank indicated at 13 having an integral head or holder 14 which is generally circular. The head rotatably confines the ball 10 and the shank provides the means for anchoring the bearing element with respect to the rod or other member. As shown in Figure 1, the shank is threaded into an axial bore 15 tapped into the end of the link 6, the shank being locked against rotation with respect to the link by means of the jam nut 16 which is threaded upon the shank. The shank 13 has a substantial lineal extent to allow the bearing element to be adjusted lengthwise with respect to the link.

Figure 3:
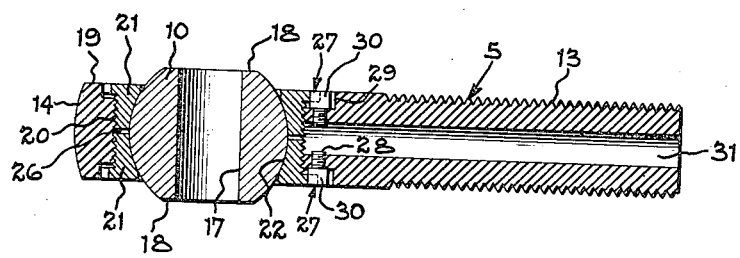
Figure 3 is a sectional view taken on line 3—3, Figure 2, illustrating in greater detail the construction of the bearing.

As best shown in Figure 3, the bearing ball 10 is provided with a bore 17 adapted to receive the bolt 11 and is further provided with the flats 18—18 which are machined into the ball in a plane at right angles to the axis of bore 17. The flats 18 provide seats for the spacer collar 9—9 or other members which are fastened to the ball.

Head 14 has substantially the same thickness as the diameter of the shank and its side faces 19 are disposed inwardly from the planes of the flats 18—18 (Figure 3). A large threaded bore 20 extends through the head and a pair of opposed threaded bushings 21—21, which complement one another to form a partially spherical socket, are screwed into the bore to confine the ball. As shown, the bushings extend inwardly from the flat sides 19 of the head and the inner portion of each bushing is provided with a spherically concave seat 22 corresponding to the external contour of the ball. In the preferred embodiment, the bushings are fabricated from bronze to provide the desired bearing characteristics and the head is fabricated from steel although other metals may be used. The bearing surfaces of the ball and bushings have a fine surface finish to allow the bushings to be adjusted into snug engagement on the ball without binding.

In assembling the rod end bearings, the ball is placed within the bore of the head, then the bushings are screwed in from opposite sides until they establish a snug engagement with the ball. The bushings are screwed sufficiently tight to prevent any appreciable looseness between the ball and bushings but loose enough to allow the ball to rotate universally with respect to the bushings. In order to rotate and adjust the bushings, each bushing is provided on its outer end with a relatively thin external flange 23 having a serration extending around its circumference, preferably formed by a series of semi-circular notches 24. Each flange is nested within a circular recess 25 formed in the face 19 of the head surrounding the threaded bore 20, the depth of the recess 25 being substantially the same as the thickness of flange 23. Thus, the external surface of the flange lies substantially flush with the head as shown in Figure 3.

It will be noted that the combined length of the opposed bushings is slightly less than the thickness of the head such that the clearance indicated at 26 in Figure 3, exists between the inner ends of the bushings when they are engaged against the ball. The bushings provide a snug fit upon the ball before the flange 23 engages the surface of the recess 25 so as to provide clearance for adjustment at assembly and to compensate for future wear between the ball and bushing surfaces.

The purpose of the semi-circular notches 24 is twofold; first, to provide purchase for a spanner wrench in screwing the bushings into the head, and secondly, to provide engagement with the head of the lock screw 27 which locks the bushing in adjusted position. For this purpose screw 27 is preferably of the socket type and the head is provided with a tapped hole which is centered upon the circumference defined by flange 23, to receive the threaded shank 28 of the screw. An enlarged counterbore 29 (Figure 2) is drilled upon the same axis to receive the head 30 of the screw with the outer end of the head flush with the surface of the flange. It will be observed in Figure 2, that the screw head is substantially of the same diameter as the radius of the semi-circular notches so as to interfit snugly with the notch and lock the bushing rigidly against rotary movement.

In assemblying the bearing, the bushings are both threaded substantially to their full limits, then they are rotated partially in forward or reverse direction, whichever may be necessary to align the notches with the axes of the screw holes. The socket screws 27 are then screwed into the holes until tight; thus, the engagement of the screw heads with the notches prevents in a positive manner any change in the initial adjustment of the bushings.

In the present example, the flange 23 is provided with eighteen of the notches 24, thus providing 20 degrees of bushing rotation from one notch to the next. The lead of the bushing screw thread is such that rotation of the bushing from one notch to the next produces approximately .002 of an inch adjustment. This is found to provide an accurate running fit for the average bearing; however, where greater precision is desired, it is contemplated to use a finer thread and to provide a greater number of notches.

It will be noted in Figure 3, that the socket screw 27 is of the hexagon-socket type which may be conveniently installed by using an ordinary small size socket type wrench. It will be apparent however, that other types of headed screws may be utilized for the same purpose for example, ordinary slotted screws or screws having a fluted socket.

As shown in Figure 3, the shank 13 includes an axial bore 31 extending to the threaded bore 20 of the head. This bore may be utilized as a lubricant reservoir, the lubricant being applied before the shank is threaded upon its link or other operating member. The lubricant passes from the bore to the bearing surfaces of the ball and bushings by way of the clearance 26 existing between the inner ends of the bushings.

From the foregoing explanation, it will be apparent that the present bearing units are conveniently assembled and set to a required running fit and that the locking screws cooperating with the notched flanges will maintain the bushings in adjusted position permanently. It will also be understood that the locking mechanism is capable of readjustment in the event that the bearing surfaces become worn after prolonged usage. In this event, it is a simple matter to remove one or both of the socket screws 27, apply a spanner wrench and tighten the bushings one or more notches. After the looseness has been taken up, the socket screws are replaced and the bearing element is again ready for service. In most cases the adjustment can be made without removing the rod end bearing from its point of installation or disturbing it in any way.

Figures 4, 5:
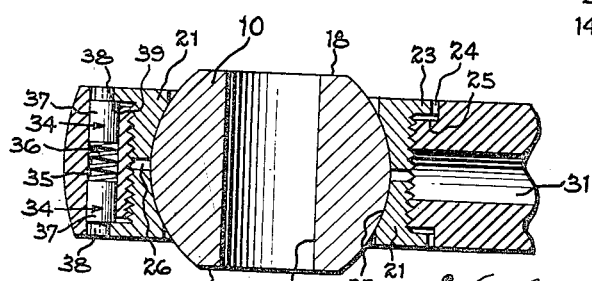
Figure 4 is a fragmentary sectional view similar to Figure 3, showing a modified arrangement utilizing one adjustable bushing instead of two.
Figure 5 is a fragmentary sectional view, showing a second modification in which spring loaded latch pins are substituted for the set screws.

In the modified rod end bearing disclosed in Figure 4, the holder or head 14 is provided with a threaded bore 32 which is open only at one side of the head, the bore being provided with a spherical seat 33 at its opposite end which is formed as an integral part of the head. The integral seat 33 is identical to and takes the place of the seat provided by the second bushing; thus, the bearing requires only one threaded bushing, the bore being swivelled between the fixed seat of the head and the adjustable seat of the bushing. This arrangement provides the same advantages of accurate fitting and adjustability as the two bushing structure and is slightly less expensive to construct and assemble. It will be obvious that the bushing may be locked in adjusted position either by a set screw as shown or by means of the spring loaded latch pin shown in Figure 5 which is described later.

The modified structure shown in Figure 5 operates upon the same principle as the structure shown in Figure 3, but utilizes a spring actuated locking device in place of the socket screws 27—27. As shown, the flange 23 includes the semi-circular notches 24 previously disclosed and in this instance the notches are engaged by spring loaded latch pins 34—34 which are confined in the hole 35 formed in the head. The hole 35 preferably is located upon the head at a point displaced from the axial bore 31 of the shank to avoid having the hole intersect the bore. As shown, a compression spring 36 is interposed between the inner ends of the latch pins, the spring being pre-loaded to urge both pins constantly in the outward direction.

In order to confine the latch pin axially, the hole 35 and the cylindrical body 37 of the pin is larger in diameter than the semi-circular notches. The pin is provided with a counterturned stud 38 of reduced diameter adapted to fit snugly within the notch. The counterturned stud is delineated by a shoulder 39 which engages the undersurface of flange 23 marginally around the notch 24. This of course locks the pins axially within the hole while the engagement of the stud 38 with the notch securely locks the bushings in adjusted position.

The bushings can be adjusted very conveniently by depressing the studs 38 out of engagement with the notches to allow the bushings to be rotated in the required direction. This arrangement produces greater convenience in making adjustments since the pins will snap automatically into engagement with the notches upon rotation of the bushings to their new setting.

The modified structure is assembled in substantially the same manner as explained earlier except that the spring and locking pins are installed in the hole 35 before assembling the ball and the socket bushings. In order to confine the pins in depressed position during assembly, a suitable clamping fixture may be engaged upon the outer ends of the studs, the fixture being adapted to engage less than one half the diameter of the studs so as to avoid interference with the edge of the flange as the socket bushings are screwed in. After both socket bushings are seated against the ball, the fixture is removed, allowing the pins to snap outwardly. In the event that the notch 24 is out of line with respect to the stud, the bushing is rotated slightly to allow the stud to snap into engagement with the notch.

Having described my invention, I claim:

1. A rod end bearing comprising a holder having a cylindrical head, said head having flat faces on opposite sides thereof and having a cylindrical shank extending radially from the cylindrical surface of the head, said cylindrical shank having a diameter equal to the thickness of the cylindrical head between said flat faces on opposite sides thereof and extending parallel with said faces, the head having a threaded bore extending therethrough from one side to the other, each flat face having a circular recess therein, a pair of cylindrical opposed bushings threaded into said bore from opposite ends thereof, the inner portion of each bushing having a concave spherical bearing socket, a ball member journalled within the opposed spherical sockets of the bushings and having a running fit therebetween, each of said bushings having a circular flange formed on the outer end thereof and disposed in said circular recesses, the diameter of said circular flanges being smaller than the cylindrical head, each of said flanges spaced outwardly from the bottom of the recess in which it is disposed, the inner ends of the bushings being spaced apart from one another, said cylindrical shank having an axial bore therethrough communicating with the space between the spaced inner ends of the bushings and feeding lubricant to the spherical bearing socket delineated by the bushings, each of said flanges having a series of equally spaced semi-circular notches formed in the outer edge portion thereof, the spacing of the notches relative to the lead of the screw threads providing a given axial movement of the bushings upon rotary indexing of each notch relative to the head, and a respective locking screw for each flange, said locking screws threaded into the flat faces of the cylindrical head on opposite sides, said locking screws having cylindrical heads interfitting a selected semi-circular notch of each bushing and thereby locking the bushings against rotation relative to the holder, said bushings being individually rotatable upon removal of the locking screws, whereby the ball member is displaced along the axis of said threaded bore when both of said bushings are rotated in a given direction, the advancement of a given number of notches relative to a point on the head providing an equal degree of adjustment of both bushings in the same direction along the axis of the threaded bore.

2. A rod end bearing comprising a holder having a cylindrical head, said head having flat faces on opposite sides thereof and having a cylindrical shank extending radially from the cylindrical surface of the head, said cylindrical shank having a diameter equal to the thickness of the cylindrical head between the said flat faces on opposite sides thereof and extending parallel with said faces, the head having a threaded bore extending therethrough from one side to the other, each flat face having a circular recess therein, a pair of cylindrical externally threaded opposed bushings threaded into said bore from opposite ends thereof, the inner portion of each bushing having a concave spherical bearing socket, a ball member journalled within the opposed spherical sockets of the bushings and having a running fit therebetween, each of said bushings having a circular flange formed on the outer end thereof and disposed in said circular recesses, the diameter of said circular flanges being smaller than the cylindrical head, each of said flanges spaced outwardly from the bottom of the recess in which it is disposed, and the inner ends of the bushings being spaced apart from one another, said cylindrical shank having an axial bore therethrough communicating with the space between the spaced inner ends of the bushings and supplying lubricant to the spherical bearing socket delineated by the bushings, each of said flanges having a series of equally spaced notches formed in the outer edge portion thereof, the spacing of the notches relative to the lead of the screw threads providing a given axial movement of the bushings upon rotary indexing of each notch relative to the head, and a respective releasable locking element for each flange, said locking elements anchored in the head and interfitting a selected notch and thereby locking the bushing against rotation relative to the holder, said bushings being individually rotatable upon release of the locking elements, whereby the ball member is displaced along the axis of said threaded bore when both of said bushings are rotated in a given direction, the advancement of a given number of notches of both flanges relative to a point on the head providing an equal degree of adjustment of both bushings in the same direction along the axis of the threaded bore.

3. A rod end bearing comprising a holder having a cylindrical head, said head having relatively flat faces on opposite sides thereof, the head having a threaded bore extending therethrough from one flat face to the other, a pair of externally threaded opposed bushings threaded into said bore from opposite ends thereof, the inner portion of each bushing having a concave spherical socket which is concentric to the threaded bushings, a ball member journalled within said concentric spherical sockets within the head and having a running fit therebetween, each of said bushings having a concentric circular flange formed on the outer end thereof, the flat faces of the head having respective counter-bores concentric with said threaded bore, the diameter of each of said counter-bores being slightly greater than the diameter of each of said circular flanges, said flanges nested within said counter-bores, each of said counter-bores having a flat bottom surface, the inner surface of each flange being spaced outwardly from the flat bottom surface of the counter-bore in which it is nested and the inner ends of said bushings being spaced apart from one another, the outer surfaces of said flanges being substantially flush with the flat faces of the head on opposite sides thereof, each of said flanges having a series of equally spaced notches formed in the outer edge portion thereof, the spacing of the notches related to the lead of the screw threads and providing axial adjustment of the bushings in micrometer fashion, and a respective releasable locking element for each flange, said locking elements anchored in the head and each having a head portion interfitting said notches selectively, said head portion locking the bushings against rotation relative to the holder by engagement with a selected notch, said counter-bores nesting the flanges and maintaining the bushings in axial alignment, said bushings being individually rotatable upon release of the locking elements, whereby the ball member is displaced along the axis of said threaded bore when both of said bushings are rotated in a given direction, the advancement of a given number of notches of both flanges relative to a point on the head providing an equal degree of adjustment of both bushings in the same direction along the axis of the threaded bore.

4. A rod end bearing comprising a holder having a cylindrical head, said head having flat faces on opposite sides thereof, the head having a threaded bore extending therethrough from one side to the other, each flat face having a circular recess therein, a pair of cylindrical externally threaded opposed bushings threaded into said bore from opposite ends thereof, the inner portion of each bushing having a concave spherical socket, a ball member journalled within the spherical sockets of the bushings and having a running fit therebetween, each of said bushings having a circular flange formed on the outer end thereof and disposed in said circular recess, each of said flanges spaced outwardly from the bottom of the recess in which it is disposed and the inner ends of the bushings being spaced apart from one another, each of said flanges having a series of equally spaced notches formed in the outer edge portion thereof, the spacing of the notches related to the lead of the screw threads and providing a given axial adjustment of the bushings relative to the head upon rotary indexing of each notch relative to the head, and a respective releasable locking element for each flange, said locking elements anchored in the head and interfitting said notches selectively and thereby locking the bushings against rotation relative to the head, said bushings being individually rotatable upon release of the locking elements, whereby the ball member is displaced along the axis of the threaded bore when both bushings are rotated in a given direction, the advancement of a given number of notches of both flanges relative to a point on the head providing an equal degree of adjustment of both bushings along the axis of the threaded bore.

References Cited in the file of this patent
UNITED STATES PATENTS

| | | |
|---|---|---|
| 1,020,423 | Hewitt | Mar. 19, 1912 |
| 1,527,764 | Wallace | Feb. 24, 1925 |
| 1,685,381 | Smith | Sept. 25, 1928 |
| 1,734,244 | Bingman | Nov. 5, 1929 |
| 2,551,437 | Jeffus | May 1, 1951 |
| 2,564,076 | Parks | Aug. 14, 1951 |